United States Patent [19]

Ayers et al.

[11] 4,373,753
[45] Feb. 15, 1983

[54] SPRING FINGER CONNECTOR

[75] Inventors: Ray R. Ayers; Robert M. Kipp, both of Houston, Tex.

[73] Assignee: Shell Oil Company, Houston, Tex.

[21] Appl. No.: 264,317

[22] Filed: May 18, 1981

[51] Int. Cl.[3] ............................................. F16L 37/12
[52] U.S. Cl. ................................. 285/319; 285/340; 285/331; 285/DIG. 18
[58] Field of Search .............. 285/331, 319, DIG. 18, 285/340

[56] References Cited

U.S. PATENT DOCUMENTS

| | | | |
|---|---|---|---|
| 1,825,962 | 10/1931 | Laird | 285/340 |
| 1,916,449 | 7/1933 | Tompkins | 285/331 |
| 2,784,987 | 3/1957 | Corcoran | 285/319 X |
| 3,181,897 | 5/1965 | Krayenbuhl et al. | 285/331 X |
| 3,339,944 | 9/1967 | Poague | 285/39 |
| 3,463,518 | 8/1969 | Broussard et al. | 285/340 |
| 3,625,552 | 12/1971 | Mahoff | 285/340 X |
| 3,628,812 | 12/1971 | Larralde et al. | 285/24 |
| 3,885,851 | 5/1975 | Bennett | 339/91 R |
| 3,912,009 | 10/1975 | Davis, Jr. | 166/240 |
| 3,933,378 | 1/1976 | Sandford et al. | 285/319 |
| 4,169,793 | 10/1979 | Lockshaw | 210/169 |
| 4,214,779 | 7/1980 | Losell | 285/319 |

FOREIGN PATENT DOCUMENTS

| | | | |
|---|---|---|---|
| 1095533 | 12/1954 | France | 285/331 |
| 1212340 | 10/1959 | France | 285/340 |
| 852787 | 11/1960 | United Kingdom | 285/331 |

OTHER PUBLICATIONS

"Industrial Sealing Technology" by H. Hugo Buchter, 1979.
"Gamah Metal Seal Couplings" from the Gamah Design Handbook Gamah Division of Stanley Aviation Corp., P.O. Box 20308, Denver, Co. 80220.

*Primary Examiner*—Thomas F. Callaghan

[57] ABSTRACT

A tension spring finger connector is provided for offshore pipelines. The connector makes use of a metal seal which is reusable and does not require a diver for subsea connection operations. The holding components of the connector are colleted spring fingers and a combination drivelock ring. Sealing is accomplished with a combination of a seal ring and a flexible cantilevered support.

6 Claims, 3 Drawing Figures

SPRING FINGER CONNECTOR

BACKGROUND OF THE INVENTION

In both offshore and onshore pipeline construction, the manually welded joint has become the standard by which other forms of pipeline joining are evaluated. Pipe joining, by whatever means, is more costly offshore where weather conditions can severely hinder pipeline construction operations. In recent years considerable improvements have been made in conventional pipelaying systems, and more specifically in pipe joining processes. Semi-automatic and then fully automatic welding systems have been developed, proven in the field, and now accepted offshore. However, the art remains deficient in the provision of mechanical connectors for diverless, subsea tie-ends of large-diameter pipe in deep water. Accordingly, the present invention is directed to overcoming this deficiency of the art.

DISCUSSION OF THE PRIOR ART

The following U.S. patents are relevant to the present invention: U.S. Pat. No. 3,463,518 (Broussard et al.); U.S. Pat. No. 4,169,793 (Lockshaw); U.S. Pat. No. 3,933,378 (Sandford et al.); U.S. Pat. No. 3,912,009 (Davis); U.S. Pat. No. 3,885,851 (Bennett); U.S. Pat. No. 3,339,944 (Poague) and U.S. Pat. No. 3,628,812 (Larralde).

The Broussard et al patent provides a sealing ring 17 (shown in its unstressed condition in FIG. 3) which is generally frustoconical in shape. End portion 15 is provided with an annular seat 18 about its outer periphery to retain the radial seal 17. Part 14 is provided with a seat 19 at the point of contact with the radial seal 17. Accordingly, when parts 13 and 14 are threaded together, radial seal 17 is retained between the members by means of the seats 18 and 19. End portion 15 of Broussard et al is relatively thick, unlike the longer and thinner cantilevered seal lip 21 of the present invention.

Larralde et al. provides a connector utilizing spring fingers for making a connection. Spring fingers 40 are provided with tapered shoulders 46 and 45 which co-act with shoulders 35 and 14 in order to lock the joint into place. A stainless steel sealing ring 25 and crescent shaped member 26 effectively slide together to effect a seal so that the movement of the mechanism is primarily one of translation. By comparison, the present invention utilizes a movement which is primarily rotation as the sealing ring is held under tension and rotated into a sealing connection.

The commercially available Gamma metal seal ring "Gamma Seal Design Handbook" has some similarities to the seal ring used in the present invention. However, there are two major differences. First, good sealing practices, especially for gas applications, require use of less pointed (rounded) sealing edges (page 32 of *Industrial Sealing Technology* by H. H. Buchter, 1979). Additionally, sharp edges are more susceptible to damage during handling, particularly in offshore operations. Second, the seal must act against at least one elastic seat in order to achieve more reliable sealing. Thus, the seal ring of the present invention has rounded edges and acts against at least one elastic seat.

SUMMARY OF THE INVENTION

The tension spring finger connector of the present invention is composed primarily of joining components for holding pipe ends together and sealing components for preventing leakage. The holding components preferably are colleted spring fingers and a combination drive-lock ring, but other holding components well known in the art can be used, e.g., threaded connectors. Sealing is accomplished with the combination of a seal ring and a cantilevered support. The fingers of the collet spring finger assembly are long enough so that sufficient radial motion of the finger tips exists to allow stabbing of a connector hub without plastic deformation of the fingers. The radial force required to open the fingers is minimized because of the high mechanical advantage achieved, and the fingers will spring closed on their own after stabbing to generate a prelock of the connector hub. The internal taper of the exposed finger tips provides mechanical advantage to spread the fingers with low axial force while the connector pipe end is stabbed.

During locking action, the spring fingers are pretensioned, creating contact forces on the butting connector hubs. The preload contact forces are removed while tensile loads are applied to the connector during service, so the preload holding forces are of sufficient magnitude so that a minimum contact force will remain during loading. The fingers are tensioned by moving their ends radially inward over a tapered backside of the stabbed connector hub. The outside surface of the fingers is tapered so that the fingers are driven inward as a drive ring is pushed over the fingers.

The combination of the tapers at the hub contact point on the inside of the finger ends and at the outside of the fingers gives a significant mechanical advantage without excessive actuation force. The outside taper of the fingers is chosen so that the drive ring will be friction self-locking. For safety, a redundant lock to the drive ring is provided since preload forces will be lost if the ring is allowed to back off significantly.

The seal ring operates by generating high contact loads between the sealing surfaces while developing a backup of stored elastic energy. The seal ring rotates during actuation, causing radial interference between the seal ring and its seat and generating sufficient contact forces for a good seal. Elastic energy is stored in the flexible cantilevered seat or support whose end provides one of the two sealing surfaces. Elastic energy is stored in the seal support which is driven radially inward as the seal ring rotates (twists).

The seal ring is reusable primarily because the sealing surfaces do not slide over one another during makeup and actuation. The seal ring is made of material harder than its seats so that it will deform the seats as required to achieve a seal.

DESCRIPTION OF PREFERRED EMBODIMENTS

The connector of the present invention meets certain criteria. First, the connector is as strong as the pipe needs to be in carrying bending and axial loads and has sufficient torsional resistance to meet operational loads. Second, the connector provides and maintains sufficient contact pressure and specified geometric relationships to ensure adequate seal actuation. In other words, looseness of the joint is avoided to ensure effective sealing, and an uncomplicated load path is utilized to help reach this goal. Third, the connector is designed to tolerate a small amount of misalignment prior to locking and to be self-aligning during makeup. Fourth, the alignment procedure for the connector is simplified so that torsional alignment of the pipe is not required to mate the connector halves. Fifth, the connector is reversable or remakable. Thus, the alignment and connection process is more reliable since the option of removal and re-insertion after problems are encountered is allowed. Reversability is important since later repair or replacement of components in the connector or adjacent pipeline may be necessary. Sixth, the connector is designed to comply with pipeline operations which require the inner wall of the connector to pass a spherical pig. This is the minimum requirement for cleaning of the completed pipeline. Seventh, the connector is designed for manufacture from corrosion-resistant materials. All connector surfaces exposed to the transported product as well as those exposed to sea water must be compatible and must resist corrosion to help ensure long-term integrity of the joint.

In addition, the seal employed in the connector of the present invention meets the following criteria. First, the seal has high plastic contact stresses to afford maximum sealing in spite of poor surface finishing of the mating surface. Second, the seal is configured such that sliding of sealing surfaces is avoided, making possible the re-use of the seal and seat. Third, the seal has high stored elastic energy in the seal/seat region in order to accommodate potential relative movement of the mating surfaces, and to accommodate potential machining tolerance problems. And fourth, the seal can be seated with low axial preload force, reserving most of the available preload capacity for maintaining connector integrity rather than for sealing.

Figure 1:
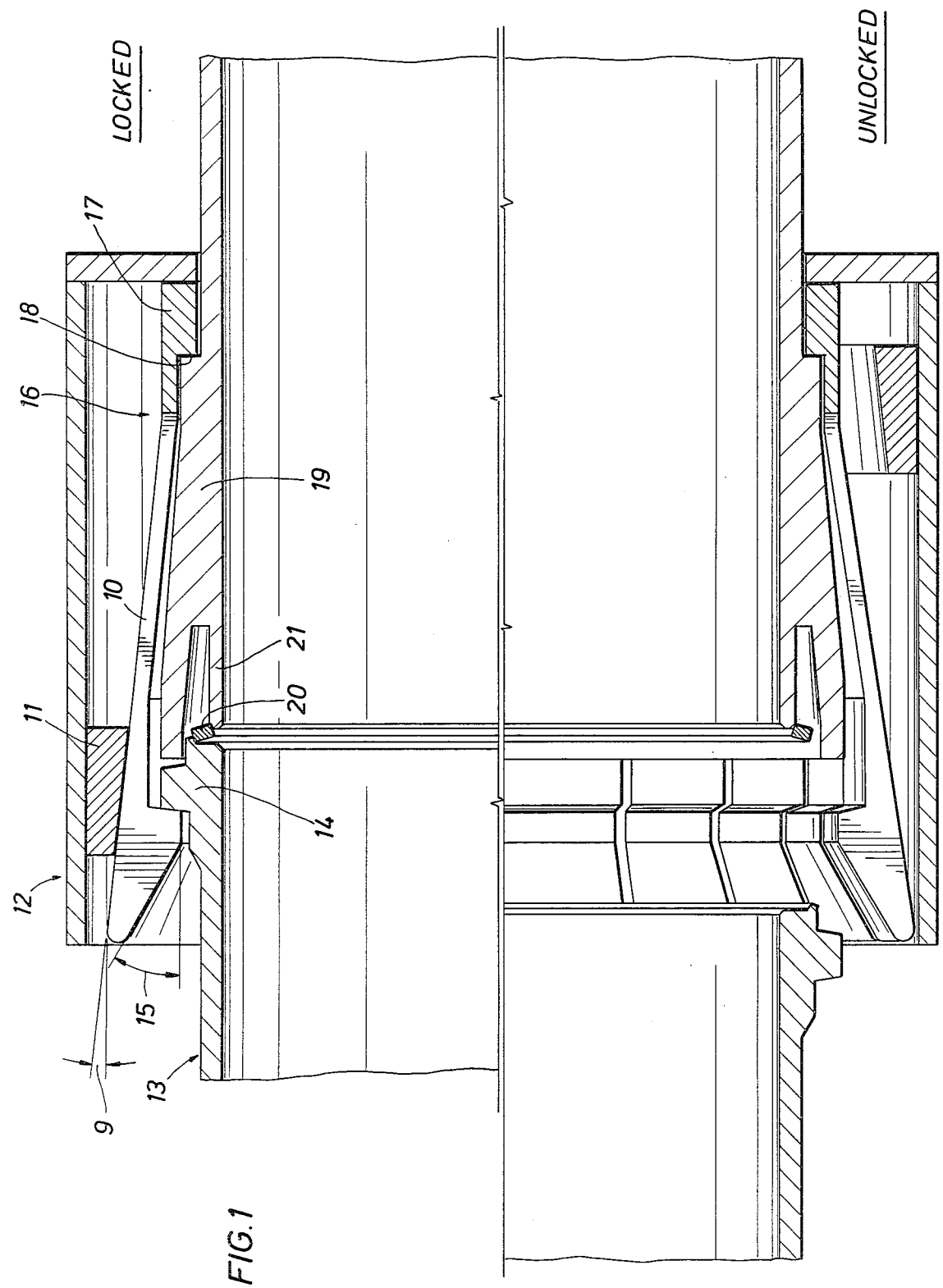
FIG. 1 shows a first embodiment of the invention employing a backup ring for the seal support ring.

The basic design of the tension spring finger connector of the present invention is shown in FIG. 1. The colletted spring fingers 10 and the drive-lock ring 11 are the principal holding components of the invention. Outer guard cylinder 12 protects spring fingers 10 from large deformation during stabbing of the connector over an exposed pipe end 13. The exposed pipe end has a locking shoulder or hub 14 having a taper of from 3 to 15 degrees which allows for mechanical tolerances. Spring fingers 10 have an inner shoulder taper angle 15 of 5 to 45 degrees in order to act as a guide cone as the spring fingers are slipped over the locking shoulder 14. For convenience the spring fingers may be manufactured as a solid cylinder and then cut out up to line 16 in order to form the individual fingers. The remaining part of the spring finger piece forms a locking shoulder 17 which secures to the shoulder 18 of a cantilevered hub 19.

Sealing is accomplished with the combination of a seal ring 20 and cantilevered seal lip 21. The seal ring is a section of a truncated cone or, preferably, a flat seal ring. Rotation or twisting of seal ring 20 causes radial interference. Sealing edges on seal ring 20 are slightly rounded for better sealing. Thin-walled seal lip 21 is deflected radially inward at its tip due to rotation of seal ring 20, causing plastic sealing pressures at the seal/seat interface and causing elastic strain energy to be stored so that any subsequent motions of seal ring 20 due to partial separation of connector hubs 14 and 19 during the long-term life of the connector will not cause leaking. In order to avoid excessive seating pressures at the seal/elastic seat interference (locally rupturing the sealing surfaces, and making leaks possible, particularly on re-sealing), seal lip 21 must be longer and thinner than the cylinder shown in U.S. Pat. No. 3,463,518 (see Examples herebelow for calculations).

As above noted with respect to the seal ring 20, a flat rectangular cross section is preferred. This type of ring is easier to fabricate than a frustoconical seal such as shown in U.S. Pat. No. 3,463,518. The twisting action of the frustoconical seal ring and the flat rectangular cross section are similar, but the extra material required for the frustoconical seal ring makes the ring stiffer in torsion than preferred for purposes of the present invention.

The configuration of spring fingers 10 as shown in FIG. 1 is considered critical. An increased axial flexibility, such as caused by a slight bend in the fingers or by inadequate size of ring 17 to which they are attached, decreases the performance of the connector and may lead to premature plastic stretch deformation of the fingers, requiring a shim for further use. The actuation forces required for locking may be adjusted by variation of the extended outer taper, angle 9, on the fingers. For example, an angle of $7\frac{1}{2}$ degrees is too steep; a preferred taper is from 3 to 4 degrees. The taper is meant to be decreased only near the ends of the fingers, starting around the middle of the fingers.

Figure 2:
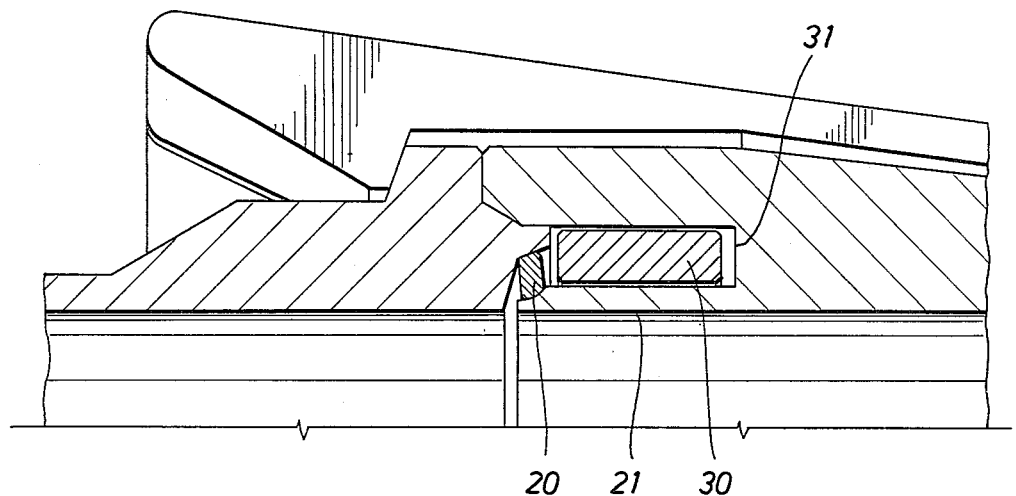
FIGS. 2 and 3 show second and third embodiments of the invention utilizing alternate backups for the seal support ring.

With respect to FIG. 2, this alternative embodiment provides a backup ring 30 to support cantilevered seal lip 21. As above noted, the function of seal lip 21 is to act as a source of stored elastic strain energy after the seal ring 20 is tipped during seal actuation, driving seal lip 21 radially inward. Design to achieve this goal requires the seal lip to be thin compared to ordinary pipe wall thickness, i.e., ordinarily a thickness of less than one half the pipe wall thickness. In the basic design shown in FIG. 1, seal lip 21 has to resist internal pressure forces which tend to cause expansion of the lip. Design to resist this deformation requires either thickening of the lip (which adversely affects contact loading on the seal surface) or careful control of material properties (e.g., by post manufacture heat treatment of the seal lip to increase yield stress, which is difficult and expensive). Backup ring 30 provides material for resistance to radial expansion of seal lip 20. Since it is not fastened to the seal lip 21, it does not resist the desired flexibility of the lip for inward radial motion. Effectively, the equivalent of a thick seal lip to resist outward motion and a thin seal lip to resist inward motion is provided. Backup ring 30 is a force fit over seal lip 21. The degree of allowable looseness is a function of how far outward seal lip 21 may be allowed to deform radially before the geometry of the lip is changed enough to inhibit the effectiveness of seal 20. Generally, the outside diameter of the backup ring is made large enough to provide sufficient strength to the ring, and for convenience, it is a good fit inside the annulus 31. The backup ring should allow the seal lip to deflect no more than about one percent of the pipe diameter.

Figure 3:
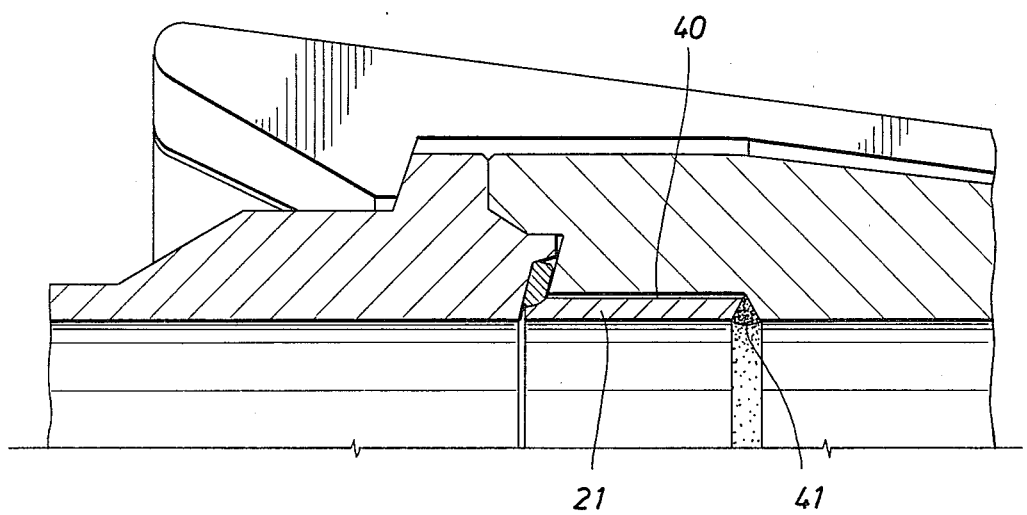

An alternative to the use of backup ring 30 is shown in FIG. 3. Thus, an ultra-thin annular space 40 is provided outside the seal lip. This configuration can be made by making the seal lip 21 as a separate piece. In this case, the connector body acts as a backup and support seal ring 21 is welded at location 41. The original design as shown in FIG. 1 is drawn in phantom for comparison purposes. The space 40 should be such that a similar fit between the connector body and seal lip is created as when a back up ring was specified above.

EXAMPLES OF THE INVENTION

The swivel connector of U.S. Pat. No. 3,463,518 uses a cantilevered seal support. But in the highly critical and expensive deep subsea connection operations where the connector of the present invention is suited, a higher degree of radial interference is needed than afforded by solving the equation for "S" in lines 35-40 of U.S. Pat. No. 3,463,518. The deflection "S" for the example would be only 0.002 inches. Machining tolerances for such a connector would normally be greater than this, and the seal fit would be poor. The solution to this problem is to use radial interference "S" of 0.010 to 0.030 inch, then make the cantilever thinner so that the contact pressures between the seal and seat do not become excessive. For the same type of example as in U.S. Pat. No. 3,463,518, the cantilever seal would have a thickness that is less than half the pipe wall thickness.

With respect to seat design procedure, the maximum allowable radial interference based on elastic limit can be approximated by the following hoop stress-strength equation:

$$\delta^R(\text{allow}) = (R/E)\sigma(\text{allow})$$

where
$\delta^R(\text{allow})$ = Allowable radial interference in inches
$R$ = Seat mean radius at tip
$E$ = Modulus of elasticity ($E = 30 \times 10^6$ psi for steel)
$\sigma(\text{allow})$ = Allowable hoop stress, psi For example, with an allowable stress of 30,000 psi and a means radius of 6 inches a steel seat would permit a radial interference of 0.006 inch. This result is observed to be independent of wall thickness.

This value of 0.006 inch is still not enough to easily accommodate usual machining tolerances, so recommended design procedure calls for allowing the cantilever seat to yield upon seating. If the allowable radial interference is set at 0.030 inch, the hoop strain is 0.6% which is quite low when compared with a 20% typical ultimate elongation of mild steel. The key in this case is that the radial interference is carefully controlled by the seal ring rotation, and later the pressure will act to deform the seat back outward. Consequently, this design is quite safe, provided that the seating material has good ductility. Further, there would be no difficulty with circumferential buckling of the seat under normal conditions since the inward deflection is constrained by the seal ring. Thus, it can be assumed that the seat has been deformed inward by 0.010 to 0.030 inch or more, and the resulting stress will be above yield but less than ultimate stress.

The next step is to determine the seat thickness based on contact pressure limits on the seat/seal interface. Good design practice for sealing is that the contact pressure be at least two times the Yield stress of the softer material (*Industrial Sealing Technology* by H. H. Buchter, 1979). If the seat material has a yield stress of 30,000 psi (and the seal ring is higher strength), and the effective contact area is $\omega = 3/16$ inch, the radial force in lbs/inch is:

$$V = 2\sigma\text{yield } \omega$$

$$V = 2(30,000)(0.188) = 11,280 \text{ lb/inch}$$

The design requirement is to achieve at least this contact loading at the seal seat. The elastic stress limit in this example is 30,000 psi, so the elastic radial deflection (if the connector were taken apart) is about 0.006 inch (as calculated above).

Given the stress and radial deflection, the seat thickness is determined using the following relation (*Formulas For Stress and strain*, Raymond J. Roark, 1954, page 271).

$$\delta^R = -V/2 \ D\lambda^3$$

What is claimed is:

1. A connector for releasably joining the ends of two pipes together comprising:
    a first hub member attached to an end of one of the two pipes and having an outer shoulder and an inner annular recess;
    a cantilevered hub member attached to an end of the other of the two pipes and having an outer lip adapted to align and engage with the shoulder of the first hub member and an inner lip having an outer annular recess and a thickness of less than one-half a pipe wall thickness;
    a plurality of spring expandable, contactable fingers extending from an annular shoulder and laterally across the outer lip of the cantilevered hub member to a position to be engageable with the outer shoulder of the first hub member, the fingers being adapted to lock the outer shoulder of the first hub member to a shoulder on the pipe end adjacent to the annular shoulder; and,
    an annular sealing ring adapted to be seated between the inner annular recess of the first hub member and the outer annular recess of the inner lip of the second hub member, the sealing ring being adapted to inwardly deflect the inner lip of the cantilevered hub member and to coact with the inner lip to store elastic strain energy.

2. The connector of claim 1 wherein the spring fingers have an extended outer taper angle of from about 3 to 4 degrees.

3. The connector of claim 1 wherein the spring fingers have an inner shoulder taper angle of about 5 to 45 degrees.

4. The connector of claim 1 wherein a thin annular space separates at least part of the lips of the cantilevered hub member.

5. The connector of claim 4 wherein the annular space is less than one-half percent of the pipe diameter.

6. A connector for releasably joining the ends of two pipes together comprising:
    a first hub member attached to an end of one of the two pipes and having an outer shoulder and an inner annular recess;
    a cantilevered hub member attached to an end of the other of the two pipes and having an outer lip adapted to align and engage with the shoulder of the first hub member and an inner lip having an outer annular recess and a thickness of less than one-half a pipe wall thickness;
    a plurality of spring expandable, contractable fingers extending from an annular shoulder and laterally across the outer lip of the cantilevered hub member to a position to be engageable with the outer shoulder of the first hub member, the fingers being adapted to lock the outer shoulder of the first hub member to a shoulder on the pipe end adjacent to the annular shoulder;

an annular sealing ring adapted to be seated between the inner annular recess of the first hub member and the outer annular recess of the inner lip of the second hub member, the sealing ring being adapted to inwardly deflect the inner lip of the cantilevered hub member and to coact with the inner lip to store elastic strain energy;

and, a backup ring which loosely fits between the lips of the cantilevered hub member and allows the inner lip to outwardly deflect no more than one percent of the pipe diameter.

* * * * *